UNITED STATES PATENT OFFICE.

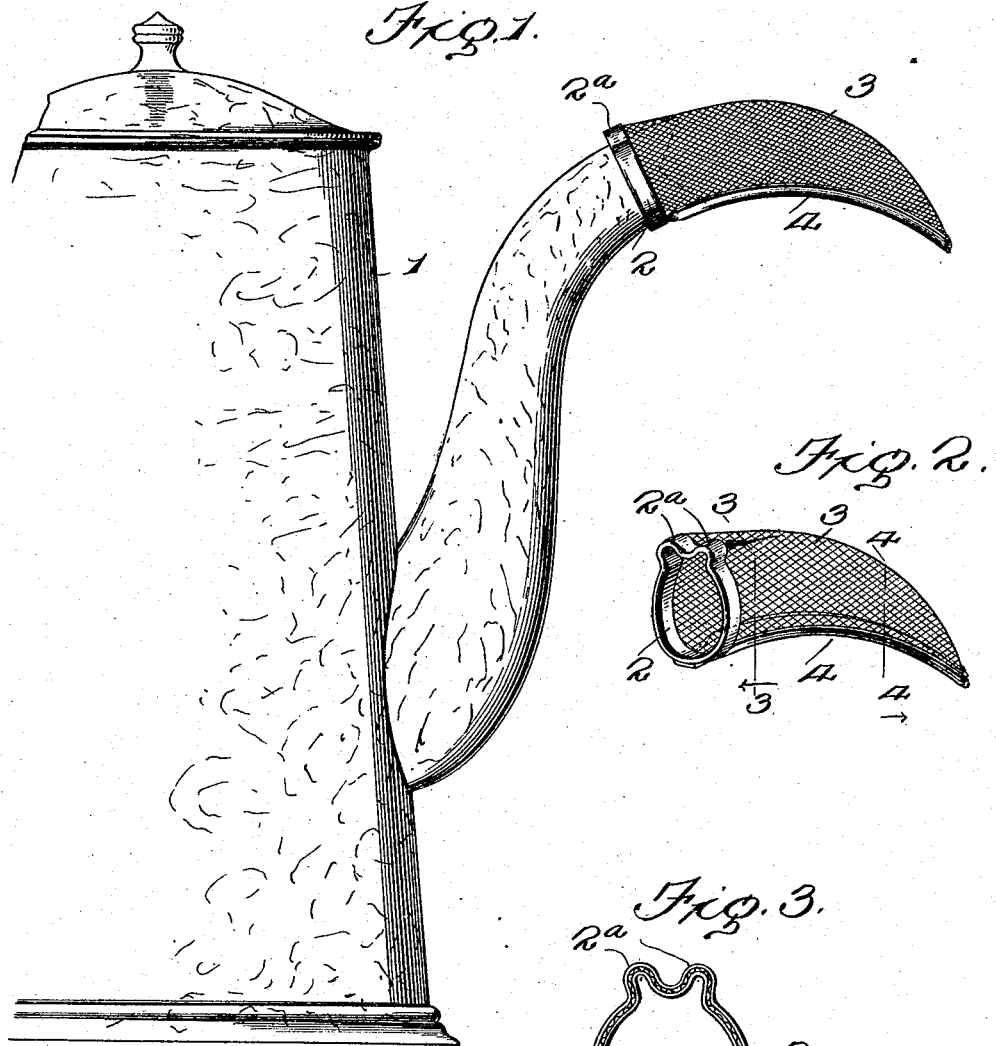

ALEXANDER NEWMAN, OF BUTTE, MONTANA.

STRAINER FOR TEAPOTS.

937,168.  Specification of Letters Patent.  Patented Oct. 19, 1909.

Application filed February 4, 1909. Serial No. 476,006.

*To all whom it may concern:*

Be it known that I, ALEXANDER NEWMAN, a citizen of the United States, residing at Butte, in the county of Silverbow and State of Montana, have invented certain new and useful Improvements in Strainers for Teapots, of which the following is a specification.

The present invention relates to an improved device for straining tea or any other liquid while it is being turned from the spout of a tea pot or analogous member, and the object of the invention is the provision of a simple and inexpensive device of this character which is peculiarly constructed so that the liquid will pass away from the strainer in an even and well directed stream, thereby enabling the liquid to be readily collected in a cup or similar receptacle without danger of spilling.

The invention further contemplates a device which can be readily applied to various sizes of tea pots, and which will operate in an effective manner to remove all leaves, grounds, or other soild matter from the liquid.

For a full understanding of the invention and the merits thereof and also to acquire a knowledge of the details of construction and the means for effecting the result, reference is to be had to the following description and accompanying drawings, in which:

Figure 1 is a side elevation of a tea pot having a straining device applied thereto, portions of the pot being removed; Fig. 2 is a detached perspective view of the strainer; Fig. 3 is a sectional view through the strainer on the line 3—3 of Fig. 2; Fig. 4 is a similar view on the line 4—4 of Fig. 2.

Corresponding and like parts are referred to in the following description and indicated in all the views of the drawings by the same reference characters.

For the purpose of illustration the invention is shown as applied to the spout of a tea pot 1 which is of the usual construction. Fitted upon the end of this spout is a ring 2 one side of which is formed with a pair of crimped portions 2ª which permit the ring to be either expanded or contracted so as to be readily fitted upon various sizes of spouts. Carried by this ring is a substantially conical shaped screen or straining member 3 which is curved longitudinally to conform to the curvature of the spout so that liquid passing into the straining screen from the spout will have a tendency to follow the curvature thereof to the apex. Extending along the concave side of the straining screen 3 is a rib 4 which is shown as having a V-shape cross section, one end of the rib being secured to the ring while the opposite end is secured to the apex of the screen. This V-shaped rib forms in effect a channel for causing the tea passing through the interior of the screen to flow toward the apex thereof, and also tends to direct any tea upon the exterior of the screen toward the apex. It will thus be obvious that as the tea or liquid is turned from the spout it will follow the screen to the apex thereof where it will be discharged in a well directed stream. Such a construction has the advantage of enabling the liquid to be easily collected in a cup or like receptacle without any spilling, and is preferable to the ordinary strainer in which the grounds and leaves collect at the bottom and cause the tea to overflow upon the sides in several individual streams which are extremely difficult to catch in a cup.

Having thus described the invention, what is claimed as new is:

1. A strainer adapted to be applied to the spout of a tea pot or the like and formed with a substantially conical shaped straining member which is curved longitudinally and terminates in an apex, the concave side of the straining member being reinforced by a rib which extends to the apex.

2. A strainer having a ring adapted to be attached to a spout, said ring carrying a conical shaped longitudinally curved tube of foraminiferous material, said tube being tapered to its extremity and having a longitudinally curved reinforcing rib attached to the base and extending to the extremity of the foraminiferous tube.

3. A strainer having a ring adapted to be applied to a spout, a longitudinally curved channeled rib supported at one end by said ring and extending outward therefrom, and a longitudinally curved tube of foraminiferous material carried by said ring and supported in and being curved with the rib, said tube at its outer end gradually tapering downward to the extremity of the rib.

4. A strainer having at one end a ring of relatively pliable material formed on its upper side with a crimped portion whereby two sides of the ring may be forced toward each other by closing this crimped portion, and a foraminiferous straining member carried by said crimped ring.

5. A strainer having at one end a ring of relatively pliable material formed on its upper side with a crimped portion whereby the ring may be drawn together around the spout, a longitudinally curved channeled rib extending from the lower side of the crimped ring and a tubular straining member of foraminiferous material having its inner end attached to the crimped ring and being supported upon the channeled rib, said tubular member being tapered at its end downward toward the end of the channeled rib.

In testimony whereof I affix my signature in presence of two witnesses.

ALEXANDER NEWMAN.

Witnesses:
PETER BREEN,
JOHN JACOBSON.